United States Patent

Matsubara et al.

Patent Number: 5,517,100
Date of Patent: May 14, 1996

[54] METHOD OF CONTROLLING A SERVO MOTOR

[75] Inventors: Shunsuke Matsubara; Yasusuke Iwashita; Tadashi Okita, all of Oshino, Japan

[73] Assignee: Fanuc Ltd., Japan

[21] Appl. No.: 356,301

[22] PCT Filed: Apr. 26, 1994

[86] PCT No.: PCT/JP94/00695

§ 371 Date: Dec. 20, 1994

§ 102(e) Date: Dec. 20, 1994

[87] PCT Pub. No.: WO94/25910

PCT Pub. Date: Nov. 10, 1994

[30] Foreign Application Priority Data

Apr. 28, 1993 [JP] Japan .................................. 5-123245
Oct. 13, 1993 [JP] Japan .................................. 5-278861

[51] Int. Cl.$^6$ .................................................. G05B 11/32
[52] U.S. Cl. .................... 318/632; 318/617; 364/474.18
[58] Field of Search ........................................ 318/632, 617, 318/609, 615, 625, 571, 616, 572; 364/426.04, 426.03, 474.15, 474.18; 290/40 C

[56] References Cited

U.S. PATENT DOCUMENTS

| | | | |
|---|---|---|---|
| 4,887,015 | 12/1984 | Kuakake et al. | 318/609 |
| 4,951,208 | 8/1990 | Etoh | 364/426.04 |
| 5,027,680 | 7/1991 | Kohari et al. | 82/1.11 |
| 5,083,074 | 1/1992 | Suzuki et al. | 318/625 |
| 5,095,221 | 3/1992 | Tyler | 290/40 C |

FOREIGN PATENT DOCUMENTS

47-5969  4/1971  Japan.
3-228106 10/1991 Japan.

*Primary Examiner*—John W. Cabeca
*Attorney, Agent, or Firm*—Staas & Halsey

[57] ABSTRACT

To control a servo motor, after the sign of a shift command is inverted, a first offset amount Vmo is added to a speed command during a period the motor rotates by the amount of "a" so that inversion of sign of an integral value of the speed loop is made to occur earlier, thereby accelerating the reversal of the direction of the motor. Then, after the motor has rotated by an amount "b", a second offset amount Vto is added to the speed command, thereby causing the motor to generate a torque that is large enough for an object connected to the motor to start moving to overcome the frictional force. The first offset amount is determined based on a value of an integrator in the speed loop at the time the direction of the shift command is inverted so that the servo motor is reversed by the correct amount. The second offset value is reversed determined based on the acceleration at the moment of inversion, so that its value is optimized corresponding to the frictional force. As a result, the delay of motion at the time of reversion is small, and it becomes possible to reduce a protrusion occurring on a cut surface in the transition of machining from one quadrant to another quadrant.

10 Claims, 6 Drawing Sheets

METHOD OF CONTROLLING A SERVO MOTOR

BACKGROUND OF THE INVENTION

1. Field of the Invention

This invention relates to a servo motor control method designed to apply a certain amount of offset to the velocity command during the position loop control in order to prevent an irregular machined surface from being formed when the rotation of the servo motor is reversed in the middle of machining of a circular or arc-shaped surface while the feed shaft of a machine tool or the arm of a robot is controlled using a servo motor.

2. Description of the Prior Art

Figure 8:
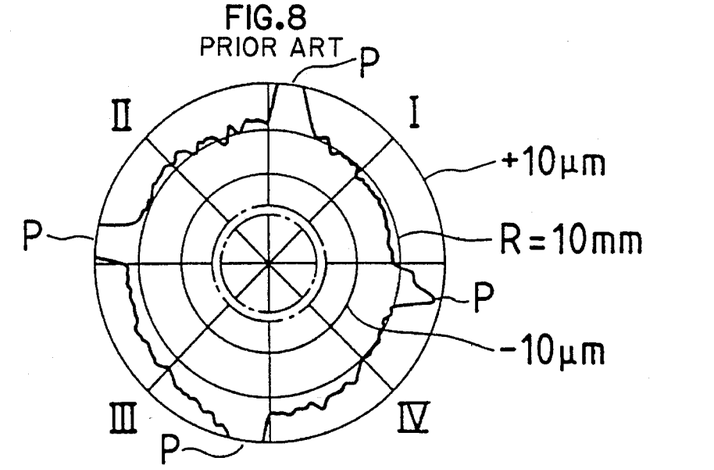
FIG. 8 is an enlarged diagram, in accordance with the prior art, showing the deviation of circular cut surface due to error from an ideal circular cut surface in the case of the cutting operation performed based on the conventional control method, in which any offsets are not applied to the speed commanded each time the sign of the position command is inverted.

In carrying out an arc-shape cutting in a X-Y plane using a machine tool driven and controlled by an X-axis servo motor and a Y-axis servo motor, irregularity of the machined surface occurs when the machining progresses from one quadrant to the next quadrant, for example, from quadrant I (x>0, y>0) to the quadrant IV (x>0, y<0), quadrant III (x<0, y<0) and quadrant II (x>0, y<0) as shown in FIG. 8.

To describe the above-mentioned phenomenon with reference to FIG. 8, the direction of drive by the X-axis servo motor is changed from positive direction (rightward direction in FIG. 8) to negative direction (leftward direction in FIG. 8), while the direction of drive by Y-axis motor remains unchanged or continues in the negative direction (downward direction in FIG. 8). Thus, the Y-axis servo motor continues to drive at the same speed and in the same direction as the previous speed and direction. However, the X-axis servo motor has an X-axis positional deviation becoming zero, and, therefore, a torque command value becomes small. Furthermore, in the speed loop control, the inversion of the sign of an integrator is delayed. The servo motor is subjected to a frictional resistance and therefore cannot immediately reverse its rotational direction. In addition, a table has backlash of a feed screw of the table; thus, the table is also unable to start shifting immediately in the opposite direction. For the reasons described above, the table cannot follow the shift command with respect to the shift movement in the direction of X axis, and this causes protrusions to be formed on a cut surface as shown by "p" in FIG. 8.

For preventing the formation of such protrusion, Japanese Patent Application Laid-Open KOKAI 4-8451 proposes a servo motor control, in which, when reversing the sign of shift command, a certain amount of offset is added to a speed command to increase the speed of the servo motor in reverse direction of rotation, thereby preventing the formation of the protrusion.

Furthermore, as disclosed in the Japanese Patent Application LAID-OPEN KOKAI 3-228106, already proposed is a method of automatically determining the amount of such an offset value for reversing the servo motor in accordance with an integral value of the integrator in the speed loop control given immediately before the servo motor reverse its direction. According to this method, the value of an integrator whose sign is reversed simultaneously with the reversal of the sign of the shift command is used as the after-reversal target value of the integrator, and the value obtained by subtracting the integral value of the integrator in each cycle of the speed loop processing from the above target value is added to the speed command so that the amount to be added is decreased gradually.

Figure 1:
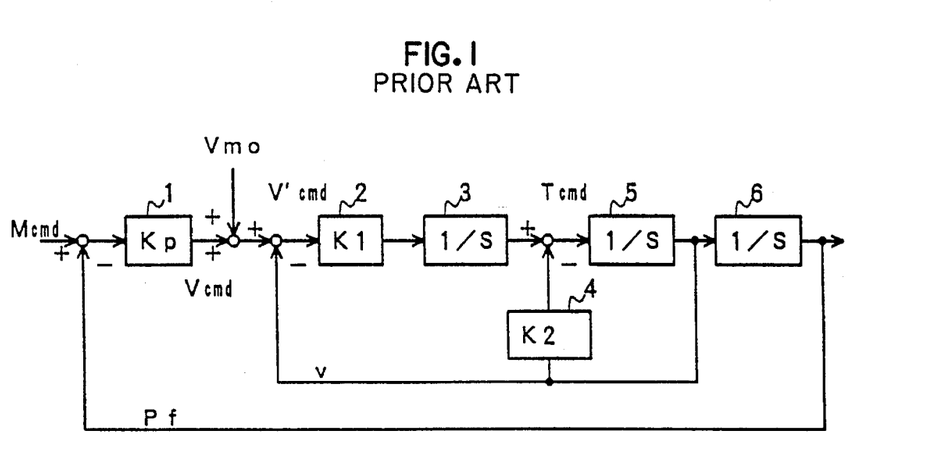
FIG. 1 is a block diagram showing a prior art servo motor control which corrects the speed command before feeding it to the speed loop, when the sign of the position command is inverted.

FIG. 1 is a block diagram showing a servo motor control such as the one disclosed in the Japanese Patent Application LAID-OPEN KOKAI 4-8451, wherein a certain amount of offset for reversing the servo motor is added to the speed command in order to accelerate the speed of the servo motor in its reverse direction of rotation when the sign of shift command is reversed. In the drawing, term 1 represents a position gain Kp used in the position loop control; term 2, an integral gain K1 used in the speed loop control; term 3, an integrator in the speed loop control; and term 4, a proportional gain K2 used in the speed loop control. Furthermore, term 5 is a transfer function of a servo motor, which is expressed in the simplified form of an integral term. Moreover, term 6 is a term of transfer function which integrates the speed of the servo motor to obtain the position. By the way, letter "S" in the drawing is representative of a Laplace operator.

In the servo motor control shown in this FIG. 1, subtracting position feedback value Pf from the position command Mcmd gives a positional deviation. Multiplying thus obtained positional deviation by the position gain Kp of the term 1 gives a speed command Vcmd. If the motor is in a normal operational condition being not given a shift command requiring reversion of the rotational direction of the motor, a motor actual speed v is subtracted from the speed command Vcmd to obtain a speed deviation. Thus obtained speed deviation is multiplied by the integral gain K1 and then is integrated (terms 2 and 3). The product (term 4) of the actual speed v and proportional gain K2 is subtracted from this integrated value to obtain the torque command (current command) Tcmd. Thus, the servo motor is driven by this torque command Tcmd. As the torque command Tcmd is identical with an acceleration command, integrating the torque command (term 5) gives the actual speed v of the servo motor. Further integrating the actual speed v (term 6) gives the position Pf of the servo motor.

When the sign of the position command Mcmd, i.e. shift direction of the command, is inverted, a predetermined amount of additional speed command for reversing the motor (i.e. an offset) Vmo is added to the above speed command Vcmd to correct the speed command to V'cmd (=Vcmd+Vmo), and, based on thus corrected speed command V'cmd, the integrator in the speed loop executes the processing for obtaining the torque command Tcmd, thereby eliminating the delay of the servo motor when reversing the rotational direction of the servo motor.

Figure 2A:
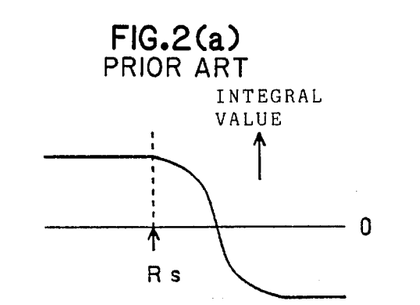
FIGS. 2(a) and 2(b) are prior art views showing time-varying integral value of the integrator in the speed loop immediately before and after the sign of the position command is reversed, in the servo motor control of FIG. 1.
Figure 2B:
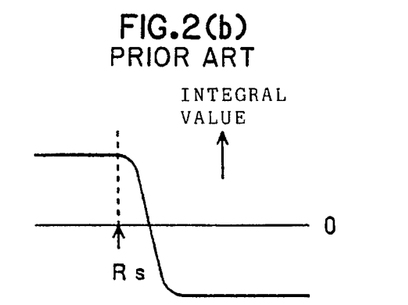

FIG. 2 is a view showing time-varying integral value of the integrator 3 in the speed loop control when the shift direction is reversed. FIG. 2(a) shows the condition of the integrator where the above-described correction (the offset Vmo) is not given to the speed command when the shift direction of the shift command is inverted.

The inversion of shift direction of the command causes inversion of sign of the positional deviation (Mcmd–Pf). And, in the processing of inverting the sign of the positional deviation, the positional deviation gradually decreases from a value of a certain sign (plus) to "0", and then it becomes to have a value of an opposite sign (minus). On the other hand, in the speed loop control, the value integrated until the time point (Rs) at which the direction of command is inverted will be maintained for a while without being reduced to "0" simultaneously with the reversal of the direction of the command. That is, even if the sign of the position command is inverted and the sign of the positional deviation is correspondingly inverted, the sign of an integral value of the integrator will not be inverted immediately. As illustrated in FIG. 2(a), the point Zr at which the integral value of the integrator becomes zero is considerably later than the time Ts.

Figure 3A:
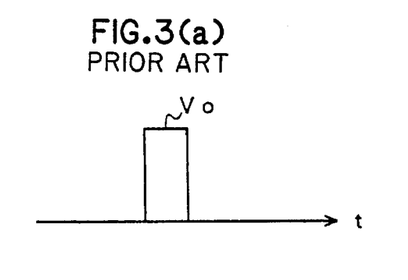
FIGS. 3(a) and 3(b) show time-varying additional portion of speed command as an offset to the speed command when the sign of the position command is reversed, in the conventional servo motor control of FIG. 1.

FIG. 2(b) shows the time-varying integral value of the integrator in the speed loop control in the case where, as shown in FIG. 3(a), simultaneously with the inversion of the sign of the position command, a constant amount of offset Vmo is added during a predetermined period of time to the speed command Vcmd obtained in the position lop control processing in order to correct the speed command. As apparent from the comparison between FIG. 2(a) and FIG. 2(b), it is indicated that when the speed command is corrected by giving the motor-reversing offset Vmo, an integral value of the integrator in the speed loop invert its sign immediately following the time (Rs) of inversion of the shift command. Once the sign of an integral value of the integrator in the speed loop is inverted, the sign of the torque command Tcmd is correspondingly inverted. Hence, such a quick sign inversion of an integral value of the integrator in the speed loop enables the servo motor to quickly reverse the rotational direction thereof. By the way, at the time when the shift command is inverted, the motor speed is almost zero, and thus the absolute value of the speed is very small; therefore, the proportional term (the term 4 in FIG. 1) of the speed loop will not affect the torque command significantly.

According to the above known art, the speed command fed to the speed loop is corrected in the manner described above to reduce the delay of machines (table and tool) in following the shift command to be given just after the shift direction is inverted, thereby preventing the formation of the protrusions on an arc-shaped cut surface occurring during the transition of machining from one quadrant to another quadrant.

However, it is usual that a driving section of the servo motor and a driven section of the table or the like are connected with ball-bearing screws or the like; thus, their movements accompany backlash. For this reason, the table cannot immediately start reversing its direction even if the driving section of the servo motor starts reversing due to its backlash. That is, the table is stopped once before starting its reverse movement. The table is kept stopped during a time period through which the driving section on the side of the servo motor continues to move through the backlash region. Even after the driving section of the servo motor has completed its reverse movement within the backlash region, the stoppage will continue until the servo motor provides to the table a torque large enough to overcome a statical friction developed between the table and the machine surface so that the machine starts moving in the opposite direction. Thus, as long as the speed command to be given to the speed loop is corrected without taking adequate account of statical friction occurring between such driving section on the side of the servo motor and the table, still there is the possibility that such statical friction will cause the delay in the movement of the table and the resulting formation of the protrusions on the arc-shaped cut surface.

Figure 4A:
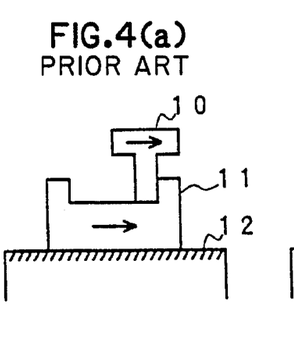
FIGS. 4(a), 4(b) and 4(c) are diagrams illustrating the movement of the driven member which comes to rest once due to backlash caused by the reverse movement of the drive member of the conventional servo motor and the resumption of its shift motion.
Figure 4B:
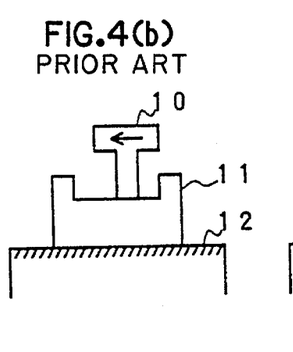
Figure 4C:
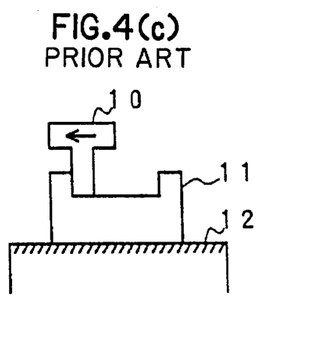

Hereinafter, the effect of backlash of the ball-bearing screw or the like will be explained with reference to FIG. 4. In FIG. 4, reference numeral 10 represents the driving section of the servo motor; reference numeral 11, a table driven by the servo motor; and reference numeral 12, a mechanical friction surface on which the table 11 slides. In FIG. 4, the driving section 10 of the servo motor continuously move the table 11 in one direction, i.e. from left to right (FIG. 4(a)). When the direction of the shift command is reversed, the driving section 10 of the servo motor moves through the region of backlash (FIG. 4(b)). Thereafter, the table 11 moves in the opposite direction (FIG. 4(c)). As shown in FIG. 4(b), the table 11 is stopped and held standstill during the time period through which the driving section 10 of the servo motor is moving through the backlash region after reversing its rotational direction. Thus, in order for the driving section 10 of the motor to move the table 11 in the opposite direction in the condition (c), it is necessary for the motor to exert on the table a force (torque) that causes the table to move against the statical friction. For this reason, it is necessary for starting the movement of the table to wait until the motor exerts a torque large enough to overcome the statical friction.

As described above, the conventional method of merely applying the motor reversing offset Vmo for correcting the speed command is not good enough for solving the delay in reverse movement which results from a static friction to be generated between the table and the machine surface, when starting to move the table, which was once stopped and then is at rest due to a backlash, in the reverse direction. In other words, it was not possible for the above-described conventional method to sufficiently suppress the occurrence of the protrusions on a machined surface.

SUMMARY OF INVENTION

An object of the present invention is to adequately suppress the formation of the protrusions on the machined surface or on arc-shaped trace by compensating the delay in the reverse movement of the table due to the statical friction between the table and the machine surface occurring when reversing the movement of the table after the table comes to rest once due to the effect of the backlash occurring when the rotation of the servo motor is reversed in the processing of the power transmission from the servo motor to the driven body.

In order to accomplish the above object, the present invention provides a control method of a servo motor comprising steps of:

obtaining a speed command to be applied to the speed loop during the first predetermined period beginning from the point of reversal of the sign of the shift command by adding the first predetermined offset to the speed command obtained through the position loop control, when the sign of the position command or the sign of the positional deviation of the servo motor for driving the object to be driven is inverted; and obtaining a speed command to be applied to the speed loop during the third predetermined period by adding the second predetermined offset to the speed command obtained through the above-described position loop control after the second predetermined period has elapsed following the lapse of the first predetermined period.

It will be preferable that an end point of the first predetermined period and start and end points of the third predetermined period are determined based on a rotational shift amount of the servo motor with a reference point corresponding to the point at which the sign of the shift command is inverted.

Further preferably, the amounts of the first and second predetermined offsets are constant values respectively irrespective of the rotational shift amount of the servo motor or the time elapsed, or either the both or one of them decrease of decreases gradually with respect to their absolute values or its absolute value as the rotation of the servo motor increases.

Further preferably, to obtain the first predetermined offset, the integrated value of the integrator in the speed loop control of the present period is subtracted from the integrated value of the integrator with inverted sign at the point at which the sign of the shift command is inverted, and the result is multiplied by a positive constant whose value is 1 or less.

Preferably, in the control method of a servo motor in accordance with claim 1 or 2, the second predetermined offset is determined by fixing the value determined based on the commanded acceleration, at the point at which the sign of the shift command is inverted, during the third predetermined period.

Moreover, it will be preferable that the second predetermined offset has an initial value proportional to a commanded acceleration at the time the sign of the shift command is inverted, and is successively reduced by a predetermined value in the following speed loop processing cycles.

As described above, according to the present invention, not only the offset for facilitating the reverse rotation of the servo motor is added to speed command simultaneously with the inversion of the sign of the shift command according to the conventional method for correcting the speed command, but also the offset for canceling the frictional force acting before the object to be driven by the servo motor starts to move is added to the speed command. Thus, in a case where the driven object is connected to a ball-bearing screw or the like for converting a rotational motion of the servo motor into a straight motion, the driven object comes to rest once while a driving section of the servo motor moves through the region of backlash with respect to the ball-bearing screw after the servo motor is reversed; however, it becomes possible to improve the delay of reversing motion due to a statical frictional force occurring when the driven object in a stationary condition again starts moving.

Furthermore, taking account of the fact that the statical frictional force occurring when the driven object in a stationary condition again starts moving is dependent on the magnitude of acceleration by which the reverse movement of driven object is to be started, and thus when the offset for canceling such a frictional force is determined based on the acceleration to be commanded, it becomes possible to perform a circular or arc-shape cutting without substantially causing a cut surface to form protrusions irrespective of its cutting speed.

DETAILED DESCRIPTION OF THE PREFERRED EMBODIMENTS

Figure 6:
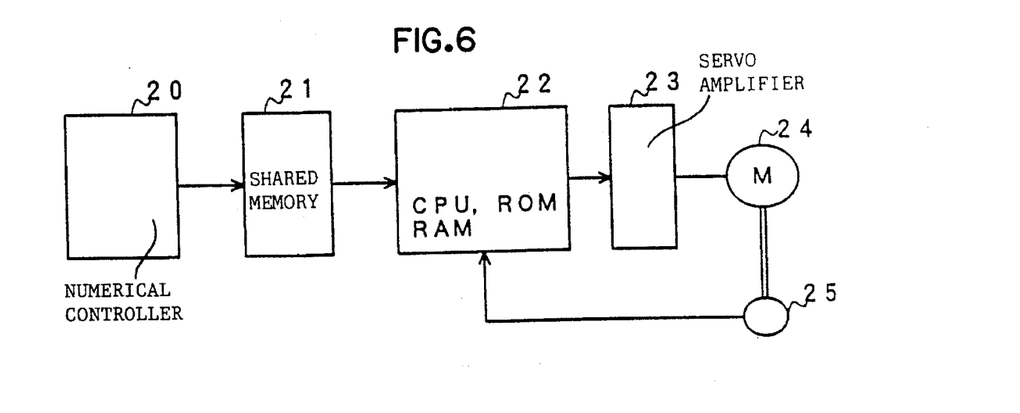
FIG. 6 is a block diagram showing essential components in a control system of a machine tool embodying an example of the present invention.

FIG. 6 is a block diagram showing the servo motor control system carrying out one embodiment of the present invention. In FIG. 6, a reference numeral 20 represents a control apparatus such as a numerical control apparatus (CNC) 10, controlling a machine tool, a robot or the like. Reference numeral 21 denotes a shared memory, which not only supplies to the processor of the digital servo circuit 22 the position command, various kinds of information, control signal, etc., which are outputted from the control apparatus 20 for supply to the machine tool or the servo motor of the robot, but also receives various kinds of information from the processor of the digital servo circuit 22 for supply to the control apparatus 20. A reference numeral 22 represents the digital servo circuit having the processor for executing position, speed and current control processing of the servo motor 14. Furthermore, a reference numeral 23 represents a servo amplifier including transistor inverters; reference numeral 24 a servo motor; and a reference numeral 25 a pulse coder which generates a predetermined number of feedback pulses per one complete revolution of the servo motor so as to feedback position and speed to the digital servo circuit 22. The digital servo circuit 22 includes a processor (CPU), a ROM, a RAM, etc. The servo motor control of FIG. 6 is known as a servo motor control using a digital servo circuit, and, therefore, will not be explained in greater detail.

Next, the first embodiment of the present invention will be explained. In this embodiment, the speed command is corrected by adding, in order, to the speed command, which is obtained through the position loop control processing, the first offset, which causes the sign of the integrated value of the integrator to be inverted and the direction of the rotation of the servo motor to be reversed quickly, that is, an offset for causing the motor to rotate, and the second offset, which causes the table to overcome the mechanical static frictional force to move the table quickly. And thus corrected speed command is transferred to the speed loop. The first offset Vmo is given at the time the servo motor is reversed, while the second offset Vto is given at the time the servo motor just when the table starts to move in the opposite direction after completing the shift motion through the backlash region following reverse rotation of the motor.

Figure 5:
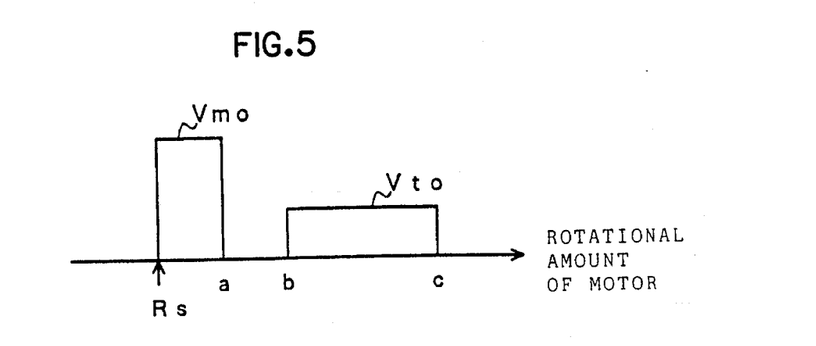
FIG. 5 is a diagram showing first and second offset amounts, in accordance with the first embodiment of the present invention, to be added to the speed command at the time the sign of the position command is reversed, each offset being expressed as a variation relative to the motor's rotational position.

Start and end points of each of these first and second offsets Vmo and Vto to be added is determined on the basis of a shift amount of the servo motor after the rotational direction of the motor is reversed, that is, on the basis of the number of pulses obtained from the pulse coder 25. More specifically, as illustrated in FIG. 5, the start point of the first offset Vmo corresponds to the point Rs at which position command starts its inversion. Assuming this point Rs to be a reference point (i.e. zero point), addition of the first offset Vmo is terminated when the shift amount of the servo motor becomes "a". Furthermore, addition of the second offset Vto is initiated when the shift amount of the servo motor becomes "b". Then, addition of the second offset Vto is terminated when the shift amount of the servo motor becomes "c". Magnitudes of these first and second offsets Vmo and Vto and values of the shift amounts "a", "b" and "c" measured relative to the reference point of inversion point of the position command ape experimentally obtained and stored in advance taking account of the characteristics of the machine.

Figure 7:
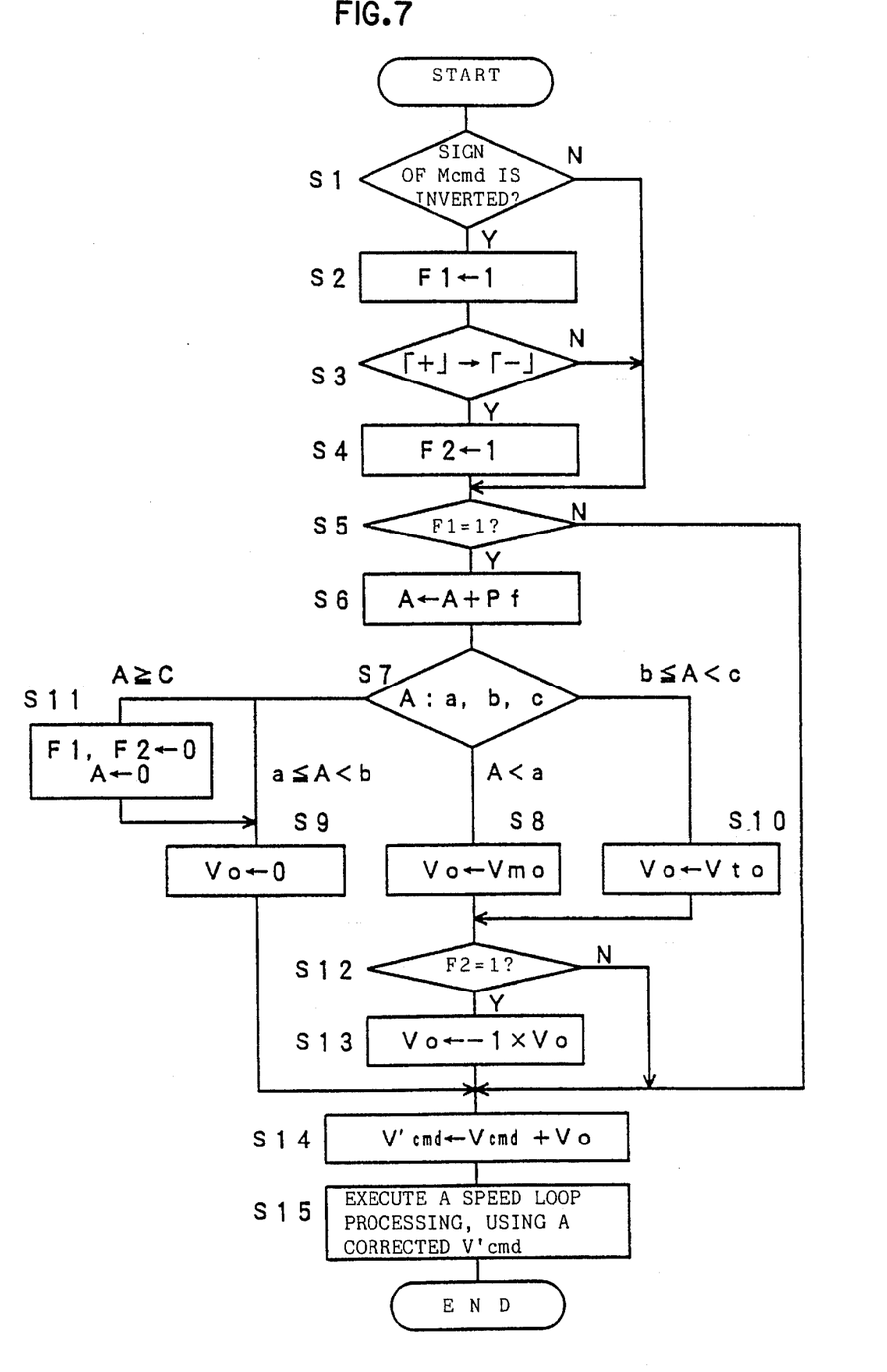
FIG. 7 is a flowchart showing the procedure in the speed loop processing cycle in accordance with the first embodiment of the present invention.

FIG. 7 is a flowchart showing the procedure of each speed loop processing cycle executed by the processor of the digital servo circuit 22 embodying the first embodiment of the present invention.

First, a judgement is made as to whether or not the inversion of sign of the position command is instructed from the numerical control apparatus 20 via the shaped memory 21 to the servo circuit 22, by checking if the sign of the position command Mcmd is inverted or not (Step S1). By the way, whether the sign of the position command Mcmd is inverted or not may also be judged by whether the sign of the positional deviation (a value obtained by subtracting the position feedback Pf from the position command Mcmd) is inverted or not, since the inversion of the sign of position command Mcmd causes the inversion of the sign of positional deviation. When the sign has not yet been inverted, the processor proceeds to step S5 and make a judgement as to whether or not a flag F1 is set to "1". The flag F1 indicates that the speed command is now being corrected in response to the inversion of shift direction. Since the flag F1 has been reset to "0" in the initial setting, the processor proceeds to step S14 wherein the value of the register for storing the speed command correction amount Vo is added to the speed command Vcmd obtained in the position loop processing. The value of this register storing the speed command correction amount Vo is also reset to "0" in the initial setting; therefore, the speed command Vcmd is directly used as a corrected speed command V'cmd in the speed loop processing to obtain a torque command, which is later fed to the current loop processing (Step S15), thereby finishing one cycle of the speed loop processing. That is, as far as the shift direction has not yet been reversed and therefore the flag F1 remains "0", a normal speed loop processing in which no offset is added to the speed command, will be executed.

On the other hand, when the inversion of sign of the position command is detected in the step S1, the flag F1 is set to "1" indicating that the speed command correction is now being executed (Step S2). Next, a judgement is made as to whether the sign of the position command Mcmd, which was "+" in the previous cycle has been changed to "−? in the present cycle or vice versa (Step S3). When the sign of the position command Mcmd which was "+" in the previous cycle has changed to "−" in the present cycle, a flag F2 is set to "1" to store the sign change direction (Step S4). On the contrary, when the sign of the position command Mcmd has changed from "−" in the previous cycle to "+" in the present cycle, the flag F2 is maintained at "0". By the way, the flag F2 has been reset to "0" in the initial setting, and is set to "0" in the processing of step S11 when the speed command correcting processing has been finished once as described later.

Then, the processor proceeds to the step S5 to check whether the flag F1 is "1" or not. As previously described, the flag F1 is set to "1" in the step S2 when the sign of the position command Mcmd is inverted. Therefore, the processor proceeds to step S6 wherein a position feedback pulse Pf obtained from the pulse coder 25 is added to an accumulator A acting as an integrator. (The accumulator A has been reset to "0" in the initial setting, and is set to "0" in the processing of the step S11 when the speed command correcting processing has been finished once as described later.) That is, the accumulator A initiates accumulation at the time the sign of the position command is inverted, which is indicated using a mark "Rs" in FIG. 2.

The value of the accumulator A, i.e. rotational amount of a motor from the time the sign of the position command is inverted, is compared with predetermined shift amounts "a", "b" and "c" (Step S7). If the value of the accumulator A is smaller than the shift amount "a" as a result of the comparison, the speed command correction amount Vo is set to the predetermined first offset amount Vmo (Step S8). If the value of the accumulator A is somewhere between the shift amounts "a" and "b", the speed command correction amount Vo is set to "0". Furthermore, if the value of the accumulator A is somewhere between the shift amounts "b" and "c", the speed command correction amount Vo is set to the second offset amount Vto (Steps S9 and S10).

When the value of the accumulator A is smaller than the shift amount "a", the processor proceeds to step S12 from the step S8, wherein a judgement is made as to whether the flag F2 is set to "1" or not, the flag F2 indicating that the sign of the position command is inverted from plus to minus. When the flag F2 is "1", and the direction of shift is inverted to the direction of "−", the speed command correction amount Vo is multiplied by "−1" to invert the sign thereof (Step S13). On the other hand, when the flag F2 is "0", and the present direction of shift is inverted to the "+" direction, the sign (+) of the speed command correction amount Vo will remain unchanged. Then, the processor proceeds to the step S14.

As described previously, this speed command correction amount Vo is added to the speed command Vcmd obtained in the position loop processing to obtain a corrected speed command V'cmd (Step S14). Then, a speed loop control processing is executed using this corrected speed command V'cmd, to obtain a torque command Tcmd, which is later fed to the current loop processing. Processings of steps S1, S5, S6, S7, S8, S12, (S13), S14 and S15 is repeated in each cycle until the value of the accumulator A exceeds the shift amount "a".

As the speed loop processing is executed by adding the first offset amount Vmo to the speed command in this manner, an integral value of the integrator in the speed loop processing quickly inverts its sign, and, thus, the servo motor start rotating in the opposite direction. Subsequently, when the shift amount of the servo motor (the value of the accumulator A) exceeds the predetermined value "a", the processor proceeds from the step S7 to the step S9 to set the speed command correction amount Vo to "0" and then proceeds to the step S14. As a result, the speed command Vcmd obtained in the position loop control processing is directly used as the corrected speed command V'cmd to be fed to the speed loop (Step S15).

When the amount of rotation of the servo motor, corresponding to the value of the accumulator A, exceeds the predetermined value b, the processing proceeds from step S7 to step S10 to set the speed command correction amount Vo to the second offset amount Vto, and then processings of steps S12 through S15 will be executed. That is, the second offset amount Vto is added to the speed command Vcmd obtained in the position loop control processing to obtain the corrected speed command V'cmd, and the speed loop control processing is executed based on this speed command V'cmd to obtain the torque command Tcmd to be fed to the current loop. Thus, according to the present invention, the second offset amount Vto is added to the speed command Vcmd to add a torque large enough to cancel the mechanical frictional force, thereby making it easier for the motor-driven section to quickly resume the movement of the table, which has once come to rest, overcoming the frictional force.

When the shift amount of the servo motor, i.e. the value of the accumulator A, exceeds the predetermined value "c" as a result of execution of the processing for adding the second offset amount Vto to the speed command Vcmd, the processor proceeds from the step S7 to the step S11 to reset both the flags F1 and F2 to "0" and further reset the accumulator A to "0". Thereafter, the processor proceeds to the step S9 to set the speed command correction amount Vo to "0", and, thereafter, executes the processings of steps S14 and S15.

In the following cycles, if the shift direction is not inverted, the processor proceeds from the step S1 to the step S5 and executes the processings of the step S14 and step S15 because the flag F1 is "0". In this case, the speed command correction amount Vo is already set to "0" in the step S9 of the previous cycle; therefore, correction of the speed command will be made.

Figure 9:
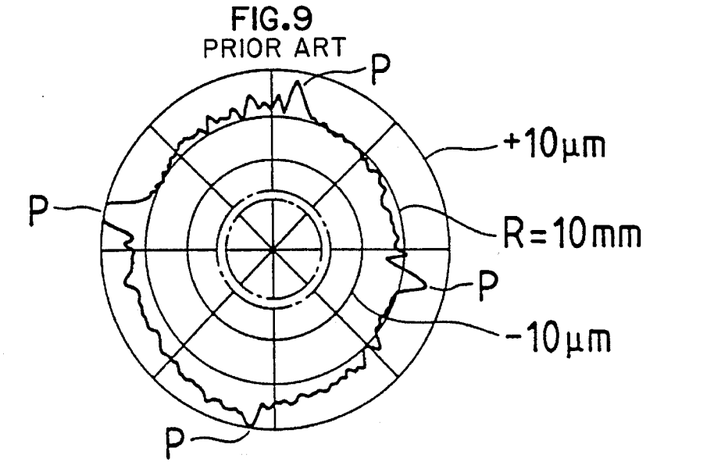
FIG. 9 is an enlarged view showing the excursion of a cut circle deviated due to error from an ideal cut circle in the case of the cutting operation based on a conventional control, in which only one offset is applied to the speed command when the sign of the position command is inverted.
Figure 10:
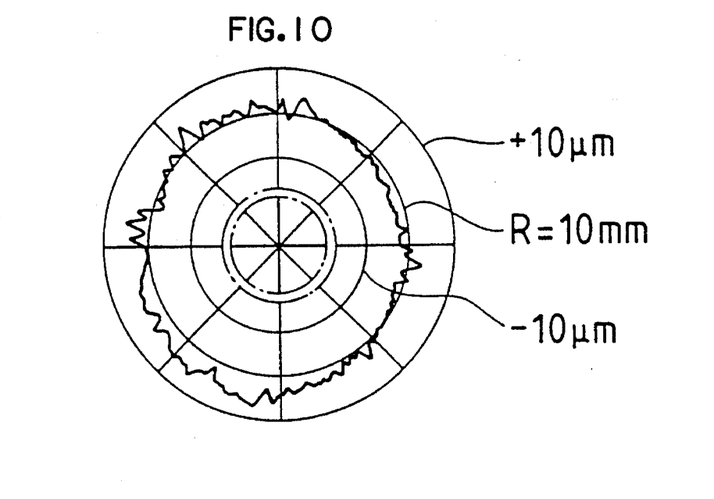
FIG. 10 is an enlarged view showing the excursion of a cut circle deviated due to error from an ideal cut circle in the case of cutting operation based on a circular cutting operation in accordance with the first embodiment of the present invention.

FIGS. 8 to 10 are enlarged views showing the excursion of a circular cut surface due to error from an ideal circle in cutting a circle with radius of 10 mm. (Scale of enlargement in circumferential direction is differentiated from that in radial direction). Of these drawings, FIG. 8 is a view showing a result of machining in a case where no offset is added to the speed command Vcmd obtained in the position loop processing, i.e. where a servo motor dedicated to each axis of a machine tool is controlled without any correction. FIG. 9 shows a result of machining where the servo motor of each axis of a machine tool is controlled with the speed command Vcmd corrected by adding only the first offset (that is, offset Vmo for reversing the rotation of the motor) to the speed command Vcmd, obtained through the position loop processing, in response to the inversion of the sign of the position command. FIG. 10 shows a case where the servo motor of each axis is controlled in accordance with the aforementioned first embodiment of the present invention.

In the case of FIG. 8 wherein the speed command Vcmd is not at all corrected in response to the inversion of sign of the shift command, a circular cut surface has a large protrusion, as indicated by a mark "p", which occurs in each transition from one quadrant to another quadrant. On the other hand, in the case of FIG. 9 wherein the speed command is corrected by adding thereto only the offset Vmo, which is for reversing the rotation of the motor, the degree of protrusion occurring at the point of transition from one quadrant to another quadrant is reduced to some extent showing a certain improvement though not large enough.

However, in the case of FIG. 9 showing the result of machining wherein the servo motor of each axis of a machine tool is controlled with the speed command Vcmd corrected by adding'thereto the first offset (that is, offset Vmo for reversing the rotation of the motor) in response to the inversion of the sign of the position command and further by adding thereto the second offset (that is, offset Vto for reversing the table), the protrusion is hardly observed at the point of transition of machining from one quadrant to another quadrant.

Figure 3B:
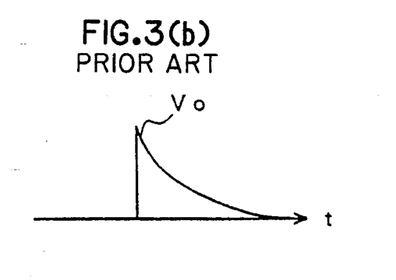

The first and second offsets in the first embodiment are set so that their values will not vary in accordance with the rotation of the servo motor as shown in FIG. 5. However, these first and second offsets may be set so that their values gradually decrease in accordance with the rotation of the servo motor as shown in FIG. 3(b). Otherwise, either one of the first and second offsets may be a constant, as shown in FIG. 3(a), whose value will not vary irrespective of change of the rotational shift amount, while the other may be a variable, as shown in FIG. 3(b), whose value gradually decreases in response to increase of the rotational shift amount.

Furthermore, as disclosed in the Japanese Patent Application Laid-Open KOKAI 3-228106, the first offset for reversing the servo motor may be a value obtained by subtracting the integral value of the integrator for the speed loop control from the target value of the integrator immediately after inverting the sign of the value of the integrator of the speed loop at the time of the reversal of the direction in each period of speed loop processing. This will be explained with reference to FIG. 3(b). The first offset amount is set to be a value obtained by multiplying the value of the integrator of the speed loop at the time of inversion of direction by "−1". Then, the integral value of the integrator for the sped loop control is subtracted from the above value at each lapse of speed loop processing period so that the value of correction (offset amount) with respect to the elapsed time period is decreased gradually as illustrated in the diagram.

In general, an object standing still on a stationary plane is subjected to a frictional reaction force when it is forcibly moved. Thus, when the second offset is set to a value that is good enough to cancel the frictional force, such an offset, as an offset for facilitating the reversing of the table, will provide an optimum value for correcting the speed command. The magnitude of a frictional force that acts on an object resting on a stationary plane, when it is forcibly moved, is proportional to the magnitude of the speed immediately after it starts moving from rest or from speed zero, more specifically, an inclination of speed (i.e. acceleration) at the time the object just starts moving. This indicates that, when applied to the case of the first embodiment, the friction is proportional to the acceleration at the time of reversion of the table.

Taking the above into consideration, the second embodiment of the present invention is characterized by calculating the magnitude of the acceleration applied to the table (driven body) to reverse the direction of its movement after it has once come to rest due to the offset of its backlash, estimating the magnitude of the friction occurring at the time of the reversing based on the magnitude of the acceleration, and determining the second offset (that is, offset Vto for reversing the table) based on the estimated friction.

For example, if a machining experiment, in which the cutting for obtaining a circular cut surface with a certain radius is carried out at a certain cutting speed and during which the direction of movement of an axis (e.g. the direction of rotation of X-axis servo motor) is reversed by applying an acceleration α0 at the time of reversing and also by applying the second offset δ0, is conducted, and the result of the experiment indicates that no protrusion has been formed on the cut surface at the point of transition of machining from one quadrant to another quadrant, the relationship between the acceleration α and correspondingly necessary offset δ can be given by the following equation:

$$\delta = \alpha \times (\delta 0/\alpha 0) \tag{1}$$

Figure 11:
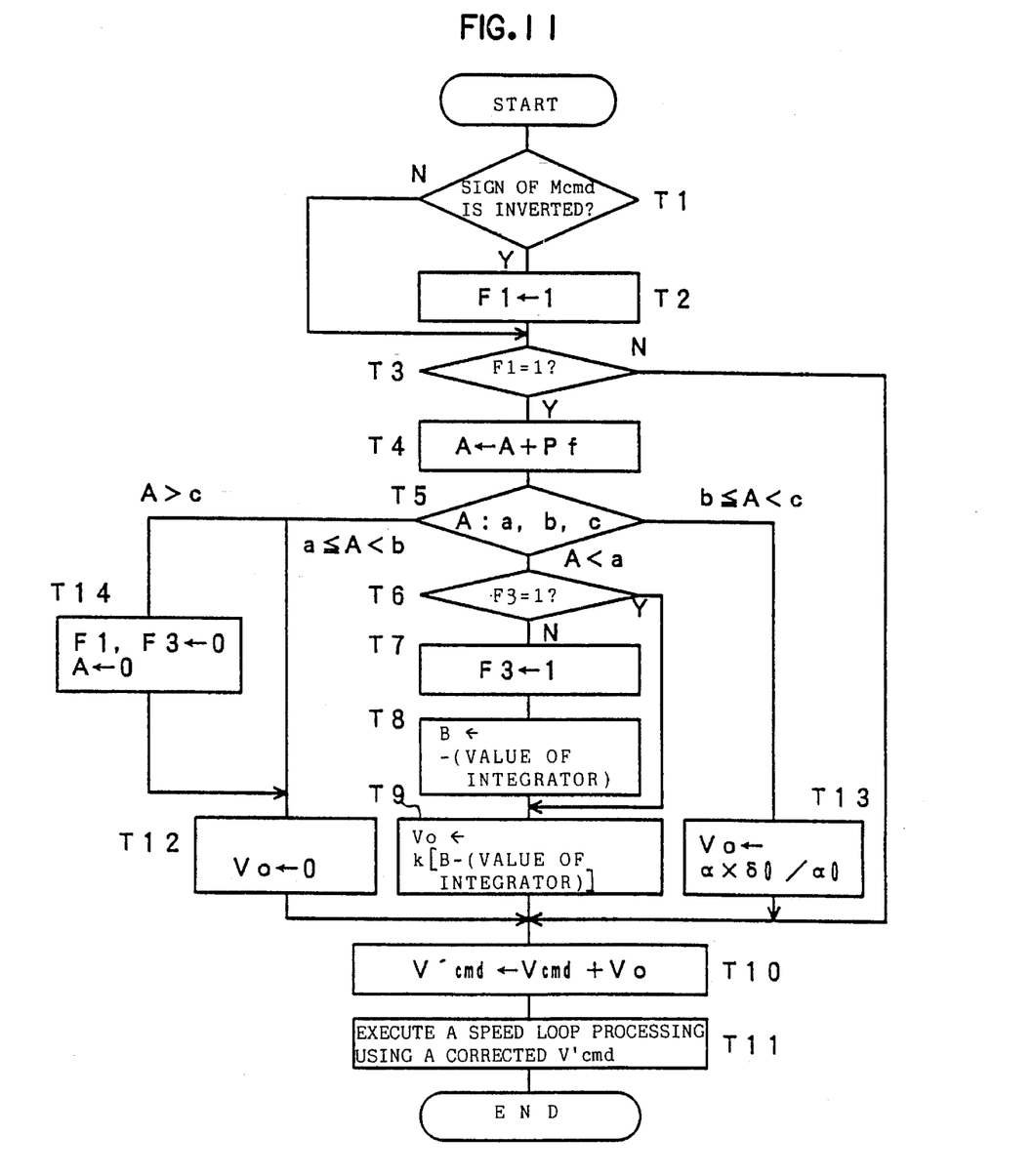
FIG. 11 is a flowchart showing the procedure in the speed loop processing cycle in accordance with the second embodiment of the present invention.

FIG. 11 is a flowchart showing the processing in each speed loop processing cycle to be executed by the processor of the digital servo circuit 22 in accordance with the second embodiment of the present invention, wherein the first offset amount is determined based on the value of the integrator in the speed loop at the time the sign of the position command is inverted, while the second offset amount is determined based on the acceleration α at the time the sign of the position command is inverted.

First, like the first embodiment, a judgement is made as to whether the inversion of shift direction is instructed or not (Step T1). When the shift direction has not yet been inverted, the processor proceeds to step T3 and make a judgement as to whether or not a flag F1 is set to "1". The flag F1 indicates that the correction of the speed command is currently in progress in response to the inversion of shift direction. Since the flag F1 has been reset to "0" in the initial setting, the processor proceeds to step T10 wherein the value of a register storing a speed correction amount Vo is added to the speed command Vcmd obtained in the position loop processing. The value of this register storing the speed command correction amount Vo is also reset to "0" in the initial setting; therefore, the speed command Vcmd is directly substituted as a corrected speed command V'cmd for the speed loop processing. The torque command obtained through the speed loop processing is then fed to the current loop processing (Step T11) to finish one cycle of the speed loop processing. That is, as far as the shift direction has not been reversed and therefore the flag F1 remains "0", an ordinary speed loop processing not adding any offset to the speed command is executed.

On the other hand, when the inversion of sign of the position command is detected in the step T1, the flag F1 is set to "1" indicating that the speed command correction is currently in progress (Step T2). Then the processor proceeds to the step T3 to make a judgement as to whether the flag F1 is "1" or not. Since the flag F1 is already set to "1", the processor proceeds to a step T4 wherein a position feedback pulse Pf obtained from the pulse corder 25 is added to an accumulator A acting as an integrator. (The accumulator A has been reset to "0" in the initial setting, and is also set to "0" in the processing of step T14 when the speed command correcting processing has once finished as described later.) As described above, the accumulator A has a value "0" immediately before the inversion of sign of the position command is detected, and starts accumulation of the position feedback pulse Pf as soon as the inversion of sign of the position command is detected.

The value of the accumulator A, i.e. a motor's amount of rotation from the time the sign of the position command is inverted, is compared with predetermined shift amounts "a", "b" and "c" (Step T5). If the value of the accumulator A is smaller than the shift amount "a" as a result of the comparison, a judgement is made as to whether a flag F3 is set to "1" or not (Step T6). The flag F3 indicates that the speed command is now being corrected by the first offset. However, the flag F3 is still reset to "0" at this moment, since the speed command correction processing has not been executed yet. Thus the processor proceeds to step T7 to set the flag F3 to "1" (Step 7).

Next, the sign of the value of the integrator in the speed loop is inverted, and the inverted value is set into a register B (Step T8). However, since the present processing corresponds to a processing at the time the sign of the position command is inverted, a value stored in the register B is obtained by multiplying by "−1" the value of the integrator in the speed loop at the time the sign of the position command is inverted. Then, to obtain the speed command correction amount Vo to be set, the value of the integrator of the speed loop is subtracted from the value stored in the register B, and the result is multiplied by a predetermined constant "k" (0<k<1) (Step S9). By the way, a value being set first in this step T9 as tile speed command correction amount Vo is k·[B−(−B)]=2 kB, since the value of the integrator at that time is "−B". That is, the value is obtained by multiplying by "−2 k (k>0)" the value of the integrator of the speed loop at the time the sign of the position command is inverted. In other words, the speed command correction amount Vo being set in this step T9 serves as a motor reversing offset, i.e. the first offset, because this speed command correction amount Vo is set when the value of the accumulator A is somewhere between "0" and "a".

Then, the processor proceeds to the step T10, wherein the value of the register storing the speed command correction amount Vo is added to the speed command Vcmd obtained in the position loop processing, thereby correcting the speed command. Then, using this corrected speed command V'cmd, a speed loop processing is executed to obtain a torque command, which is later fed to the current loop processing (Step T11) to complete the processing of the present position/speed loop processing cycle.

In the next cycle, the processor proceeds to steps T1, T3, T4 and T5. When the value of the accumulator A is still smaller than the predetermined value "a", the processor proceeds to step T9 via the step T6 (the flag F3 is already set to "1" in the previous cycle), wherein the value of the integrator of the speed loop is subtracted from the value stored in the register B, that is, the value obtained by multiplying the value of the integrator of the speed loop by −1 at the time the sign of the position command is inverted, and the result is multiplied by the constant K to obtain the speed command correction amount Vo. Subsequently, thus obtained speed command correction amount Vo is added to the speed command Vcmd obtained in the position loop processing to obtain a corrected speed command V'cmd. Using this corrected speed command V'cmd, a speed loop processing is executed to complete the present position/speed loop processing (Steps T10 and T11). Above processing is executed in each cycle until the value of the accumulator A exceeds the predetermined value "a".

Next, when the shift amount of the servo motor, i.e. the amount the servo motor rotated after the time the sign of the position command is inverted (value of accumulator A), exceeds the predetermined value "a", the processor proceeds to step T12 via the step T5 to set the speed command correction amount Vo to "0". Thereafter, the processor proceeds to the step T10, wherein the speed command is not corrected and, therefore, the speed command Vcmd obtained in the position loop control processing is directly used as the speed command V'cmd to be fed to the speed loop. Thus, the processings of steps T1, T3–T5, T12, T10 and T11 are repeated in each cycle until the value of the accumulator A exceeds the predetermined amount "b". During this period, the value of the speed command correction amount Vo is maintained at "0" and no correction of the speed command is carried out.

When the servo motor rotates until the value of the accumulator A exceeds the predetermined value "b", the processor proceeds from the step T5 to step T13 to obtain and set the speed command correction amount Vo after obtaining it by the equation (1), which is for obtaining the second offset amount (Step S13). Thus, in the case of the second embodiment, it is previously confirmed through experiment that 50 is the optimum value as the offset for reversing the movement of the table without causing the protrusion to be formed on the circular cut surface at the point of the transition of machining from one quadrant to another, where the experiment is conducted by cutting circular surfaces having equal radiuses at an acceleration that is α0 when the shift command is reversed.

By the way, the acceleration α at the time the sign of the shift command is inverted can be obtained by subtracting from the speed command of the present cycle obtained in the position loop processing the speed command obtained in the previous cycle, and then dividing the result by the position/speed loop processing period. However, it is not easy to obtain the acceleration accurately, since the processing periods of position and speed loops are extremely short, and so, in the case of the present embodiment, the acceleration is determined according to the shift command distributed in every distribution cycle by the numerical control apparatus. More specifically, a shift command in one distribution cycle is an incremental shift amount in the present cycle, and thus corresponds to speed. Hence, a difference between the shift command in the present distribution cycle and the shift command in the preceding distribution cycle corresponds to a speed change, i.e. acceleration, during one distribution cycle.

Thus obtained speed command correction amount Vo is added to the speed command Vcmd obtained in the position loop control processing to obtain a corrected speed command V'cmd (Step T10). Then, using this corrected speed command V'cmd, a speed loop control processing is executed (Step T11) to obtain a torque command Tcmd which is later fed to the current loop processing. Processings of steps T1, T3–T5, T13, T10 and T11 are repeated in each cycle until the value of the accumulator A exceeds the predetermined value "c".

When the value of the accumulator A exceeds the predetermined shift amount "c", the processor proceeds from the step T5 to the step T14 to reset both the flags F1 and F3 to "0" and further reset the accumulator A to "0". Thereafter, the processor proceeds to the step T12 to set the speed command correction amount Vo to "0" and, thereafter, executes the processing of the steps T10 and T11.

If the shift direction is not inverted in the following cycles, the processor executes the processings of the steps T1, T3, T10 and T11. In this case, the speed command correction amount Vo is already set to "0" in the step T12 in the previous cycle; therefore, correction of the speed command is not carried out.

Figure 12A:
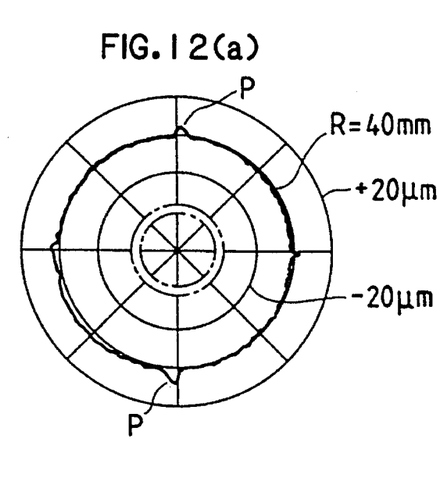
FIG. 12, like FIG. 8, is an enlarged view showing the excursion of a cut circle deviated due to error from an ideal cut circle in the case of cutting operation based on the ordinary control of a circular cutting operation, in which any offset is not applied to the speed command when the sign of the position command is inverted.
Figure 12B:
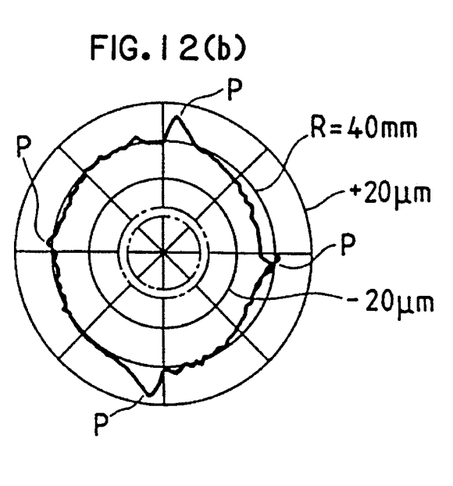

FIGS. 12 to 14 are enlarged views showing the excursion of a circular cut deviated by error from an ideal circle in the cases of circular cuttings having the radius of 40 mm carried out respectively at a low cutting speed of 1,000 rpm (graph "a") and at a high cutting speed of 6,000 rpm (graph "b") (In each drawing, the scale of enlargement in circumferential direction differs from the scale of enlargement in the radial direction). Of these diagrams, FIG. 12 is a diagram showing the result of processing, in which a servo motor dedicated to one axis of a machine tool is controlled without adding any offset to the speed command Vcmd obtained in the position loop processing. FIG. 13 is a diagram showing the result of processing in a case where a servo motor dedicated to one axis of a machine tool is controlled by adding first and second offsets to the speed command Vcmd obtained in the position loop processing. In this case, the first offset amount has its initial value determined based on a value of the integrator at the time the sign of the position command is inverted to execute the backlash acceleration correction (corresponding to the processings in steps T6–T9 in the second embodiment). On the other hand, the second offset value is a constant value irrelevant to the above equation (1), that is, not depend on the value of acceleration α at the time the sign of the position command is inverted. FIG. 14 is a diagram showing the result of processing in a case where the servo motor of one axis is controlled in accordance with the second embodiment of the present invention. That is, the first offset amount is determined based on a value of the integrator at the time the sign of the position command is inverted, while the second offset value is determined based on the value of acceleration α at the time the sign of the position command is inverted.

Figure 13A:
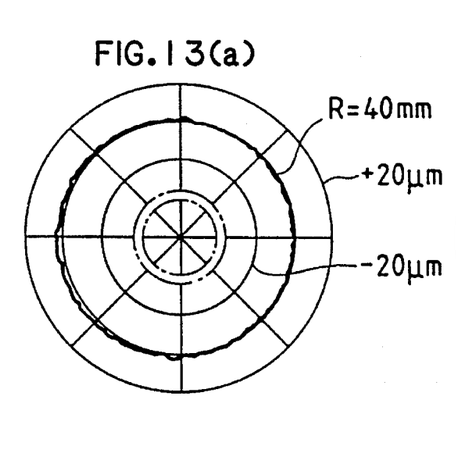
FIG. 13 is an enlarged view showing the excursion of a cut circle deviated due to error from an ideal cut circle in the case of cutting operation in accordance with the first embodiment of the present invention.
Figure 13B:
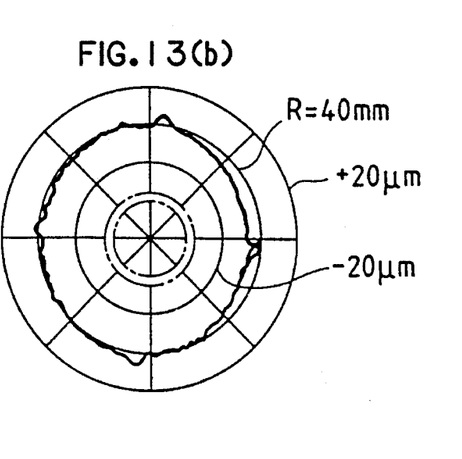

In the case of FIG. 12 wherein the speed command Vcmd is not at all corrected in response to the inversion of sign of the shift command, a circular cut surface has a large protrusion, as shown by a mark "p", which occurs in each transition of machining from one quadrant to another quadrant. On the other hand, in the case of FIG. 13, the correction of the speed command is almost optimized at a low cutting speed since a circular cut surface does not have a large protrusion in the transition from one quadrant to another quadrant as shown in FIG. 13(a). But, when the cutting speed is high, the protrusion becomes larger because of inadequate offset amount as shown in FIG. 13(b).

Figure 14A:
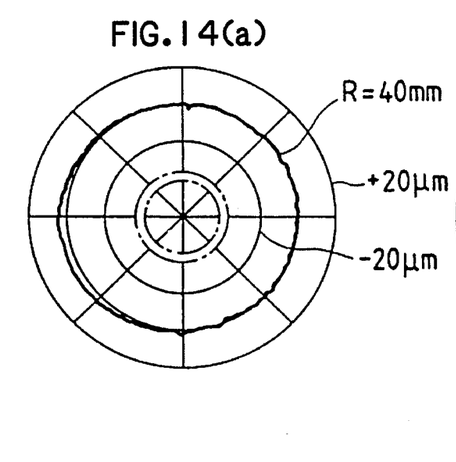
FIG. 14 is an enlarged view showing the excursion of a cut circle deviated due to error from an ideal cut circle in the case of cutting operation in accordance with the second embodiment of the present invention.
Figure 14B:
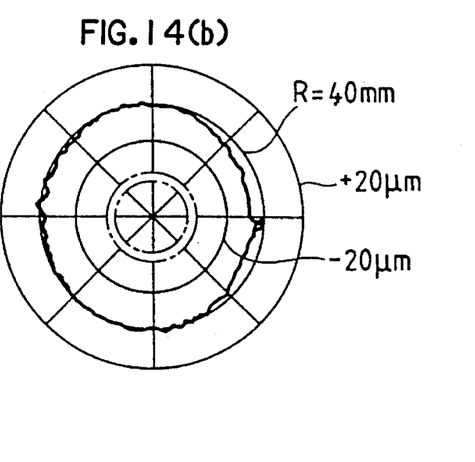

In the second embodiment, however, as shown in FIG. 14, the correction of the speed command is almost optimized in the cutting at a low speed as seen from that circular cut surface is almost free from the formation of protrusion in the transition of machining from one quadrant to another quadrant as shown in FIG. 14(a). Even, when the cutting speed is increased, the formation of protrusion is so small as to be neglected as seen from diagram (b).

In the second embodiment, the second offset α×(δ0/α0) is fixed based on the command acceleration α, available at the time the sign of the shift command is inverted, as long as the accumulator value is somewhere between "b" and "c" (Refer to the above equation (1) and step T13 in FIG. 11); however, it is also possible to determine the second offset value so as to be proportional to the command acceleration $\alpha$ only in the first speed loop processing and then reduce the offset value successively in the following speed loop processing cycles.

Although the above first and second embodiments are concerned with the case of a circular or arc cutting using a servo motor for moving a table of a machine tool, the present invention is not limited to these embodiments. For example, the present invention is also applicable to the robot such as the welding robot in order to prevent the protrusion from being formed on the surface of the weld when the arm of the robot moves making circular or arc trace.

We claim:

1. A control method of a servo motor comprising the steps of:
   obtaining a first corrected speed command by adding a first predetermined offset to a speed command obtained in a position loop control, when a sign of a shift command given to an object driven by a servo motor is inverted;
   feeding said first corrected speed command to a speed loop for a first predetermined period starting from the time the sign of said shift command is inverted;
   obtaining a second corrected speed command by adding a second predetermined offset to the speed command obtained in the position loop control; and
   feeding said second corrected speed command to the speed loop for a third predetermined period starting when a second predetermined period expires after said first predetermined period has elapsed.

2. The control method of a servo motor in accordance with claim 1, wherein an end point of said first predetermined period and start and end points of said third predetermined period are determined based on a rotational shift amount of said servo motor with a reference point corresponding to the time the sign of said shift command is inverted.

3. The control method of a servo motor in accordance with claim 2, wherein said first and second predetermined offsets are respectively a constant value irrespective of the rotational shift amount of the servo motor or time elapsed.

4. The control method of a servo motor in accordance with claim 2, wherein at least one of said first and second predetermined offsets is a variable value which gradually reduces its absolute value as the amount of rotation of the servo motor increases.

5. The control method of a servo motor in accordance with claim 2, wherein said first predetermined offset is obtained by subtracting an integral value of the integrator in the speed loop control in the present cycle from a value of an integrator in the speed loop control at the time the sign of said shift command is inverted, and multiplying the result by 1 or a positive constant of less than 1.

6. The control method of a servo motor in accordance with claim 2, wherein said second predetermined offset is determined based on a commanded acceleration at the time the sign of said shift command is inverted, and is fixed during said third predetermined period.

7. The control method of a servo motor in accordance with claim 6, wherein, in order to determine said second offset value based on the commanded acceleration at the time the sign of said shift command is inverted, a ratio of the commanded acceleration to said second offset value is equalized to a ratio of a certain commanded acceleration to an offset value which actually obtained an optimum result.

8. The control method of a servo motor in accordance with claim 2, wherein the initial value of said second predetermined offset is proportional to a commanded acceleration at the time the sign of said shift command is inverted, and is successively reduced by a predetermined value in the following speed loop processing cycles.

9. The control method of a servo motor in accordance with claim 8, wherein said commanded acceleration is calculated based on the shift command distributed in every distribution cycle from a numerical control apparatus.

10. The control method of a servo motor in accordance with claim 8, wherein an inversion of the sign of said shift command of said servo motor is judged based on an inversion of a sign of a positional deviation which is a difference between the position command and a position feedback amount.

* * * * *

UNITED STATES PATENT AND TRADEMARK OFFICE
CERTIFICATE OF CORRECTION

PATENT NO. : 5,517,100

DATED : May 14, 1996

INVENTOR(S) : Shunsuke MATSUBARA, et al.

It is certified that error appears in the above-indentified patent and that said Letters Patent is hereby corrected as shown below:

Column 6, lines 11 and 12, delete "in accordance with the prior art".

Column 8, line 18, change "-?" to -- - --.

Column 13, line 33, change "50" to --80--.

Signed and Sealed this

Twenty-fourth Day of September, 1996

Attest:

BRUCE LEHMAN

Attesting Officer     Commissioner of Patents and Trademarks